(12) United States Patent
Goering et al.

(10) Patent No.: US 9,753,947 B2
(45) Date of Patent: Sep. 5, 2017

(54) FOUR DIMENSIONAL WEATHER DATA STORAGE AND ACCESS

(71) Applicant: Weather Decision Technologies, Inc., Norman, OK (US)

(72) Inventors: Christian Goering, Norman, OK (US); Matt Orr, Norman, OK (US); Lee Robb, Oklahoma City, OK (US); James T. Johnson, Norman, OK (US)

(73) Assignee: WEATHER DECISION TECHNOLOGIES, INC., Norman, OK (US)

( * ) Notice: Subject to any disclaimer, the term of this patent is extended or adjusted under 35 U.S.C. 154(b) by 352 days.

(21) Appl. No.: 14/564,900

(22) Filed: Dec. 9, 2014

(65) Prior Publication Data

US 2015/0161150 A1 Jun. 11, 2015

Related U.S. Application Data

(60) Provisional application No. 61/914,062, filed on Dec. 10, 2013.

(51) Int. Cl.
| | |
|---|---|
| G06F 17/30 | (2006.01) |
| H04L 29/06 | (2006.01) |
| G01W 1/10 | (2006.01) |
| G01W 1/00 | (2006.01) |

(52) U.S. Cl.
CPC ......... *G06F 17/30241* (2013.01); *G01W 1/00* (2013.01); *G01W 1/10* (2013.01); *H04L 63/0876* (2013.01)

(58) Field of Classification Search
CPC ... G06F 17/30241; G06Q 90/00; G01W 1/00; G01W 1/10
See application file for complete search history.

(56) References Cited

U.S. PATENT DOCUMENTS

| | | |
|---|---|---|
| 4,582,491 A | 4/1986 | Monteith |
| 5,717,589 A | 2/1998 | Thompson et al. |
| 5,850,619 A | 12/1998 | Rasmussen et al. |
| 5,910,763 A | 6/1999 | Flanagan |
| 6,018,699 A | 1/2000 | Baron, Sr. et al. |
| 6,125,328 A | 9/2000 | Baron, Sr. et al. |
| 6,275,774 B1 | 8/2001 | Baron, Sr. et al. |
| 6,297,766 B1 | 10/2001 | Koeller |
| 6,339,747 B1 | 1/2002 | Daly et al. |
| 6,405,134 B1 | 6/2002 | Smith et al. |

(Continued)

OTHER PUBLICATIONS

Open Geospatial Consortium, OpenGIS Web Map Tile Service Implementation Standard, Apr. 6, 2010.*

(Continued)

*Primary Examiner* — William Spieler
(74) *Attorney, Agent, or Firm* — Leveque IP Law, P.C.

(57) ABSTRACT

Storage of weather data in four dimensions in a mass storage data cube for ready access. Weather data to be stored is ingested and processed with respect to location and time to generate one or more tiles each characterized by a geographic location index and a time index. The tiles are stored in a mass storage data cube in accordance with the geographic location index and the time index of each tile. The tiles containing the stored weather data can be readily accessed and retrieved from the mass storage data cube.

31 Claims, 6 Drawing Sheets

(56) References Cited

U.S. PATENT DOCUMENTS

| | | | |
|---|---|---|---|
| 6,493,633 | B2 | 12/2002 | Baron, Sr. et al. |
| 6,496,780 | B1 | 12/2002 | Harris et al. |
| 6,498,987 | B1 | 12/2002 | Wilt et al. |
| 6,505,123 | B1 | 1/2003 | Root et al. |
| 6,581,009 | B1 | 6/2003 | Smith |
| 6,590,529 | B2 | 7/2003 | Schwoegler |
| 6,603,405 | B2 | 8/2003 | Smith |
| 6,608,559 | B1 | 8/2003 | Lemelson et al. |
| 6,646,559 | B2 | 11/2003 | Smith |
| 6,654,689 | B1 | 11/2003 | Kelly et al. |
| 6,753,784 | B1 | 6/2004 | Sznaider et al. |
| 6,754,585 | B2 | 6/2004 | Root et al. |
| 6,816,878 | B1 | 11/2004 | Zimmers et al. |
| 6,823,263 | B1 | 11/2004 | Kelly et al. |
| 6,826,481 | B2 | 11/2004 | Root et al. |
| 6,829,536 | B2 | 12/2004 | Moore |
| 6,836,730 | B2 | 12/2004 | Root et al. |
| 6,845,324 | B2 | 1/2005 | Smith |
| 6,920,204 | B1 | 7/2005 | Tuttle |
| 6,941,126 | B1 | 9/2005 | Jordan, Jr. |
| 6,947,842 | B2 | 9/2005 | Smith et al. |
| 6,963,853 | B1 | 11/2005 | Smith |
| 6,980,909 | B2 | 12/2005 | Root et al. |
| 6,985,813 | B2 | 1/2006 | Root et al. |
| 6,988,037 | B2 | 1/2006 | Root et al. |
| 6,995,686 | B2 | 2/2006 | Gosdin et al. |
| 7,024,310 | B2 | 4/2006 | Root et al. |
| 7,053,780 | B1 | 5/2006 | Straub et al. |
| 7,058,510 | B2 | 6/2006 | Kelly et al. |
| 7,069,258 | B1 | 6/2006 | Bothwell |
| 7,084,775 | B1 * | 8/2006 | Smith ................ G01W 1/00 340/601 |
| 7,089,116 | B2 | 8/2006 | Smith |
| 7,139,664 | B2 | 11/2006 | Kelly et al. |
| 7,181,345 | B2 | 2/2007 | Rosenfeld et al. |
| 7,191,064 | B1 | 3/2007 | Myers et al. |
| 7,191,065 | B2 | 3/2007 | Root et al. |
| 7,194,249 | B2 | 3/2007 | Phillips et al. |
| 7,248,159 | B2 | 7/2007 | Smith |
| 7,268,703 | B1 | 9/2007 | Kabel et al. |
| 7,289,908 | B2 | 10/2007 | Root et al. |
| 7,315,782 | B2 | 1/2008 | Root et al. |
| 7,383,130 | B1 | 6/2008 | Koosam |
| 7,411,493 | B2 | 8/2008 | Smith |
| 7,421,344 | B1 | 9/2008 | Marsh et al. |
| 7,460,021 | B1 | 12/2008 | Bacon |
| 7,486,201 | B2 | 2/2009 | Kelly et al. |
| 7,602,285 | B2 | 10/2009 | Sznaider et al. |
| 7,609,819 | B1 | 10/2009 | Tuttle |
| 7,725,256 | B2 | 5/2010 | Marsh |
| 7,788,029 | B2 | 8/2010 | Nagase et al. |
| 7,869,953 | B1 | 1/2011 | Kelly et al. |
| 8,024,112 | B2 | 9/2011 | Krumm et al. |
| 8,060,591 | B1 * | 11/2011 | Gailloux ........... H04M 1/72525 379/88.16 |
| 8,320,873 | B2 | 11/2012 | Sennett et al. |
| 2002/0004705 | A1 | 1/2002 | Baron, Sr. et al. |
| 2002/0016677 | A1 | 2/2002 | Baron et al. |
| 2002/0039405 | A1 | 4/2002 | Newland et al. |
| 2003/0093530 | A1 | 5/2003 | Syed |
| 2003/0120426 | A1 | 6/2003 | Baron et al. |
| 2004/0172655 | A1 | 9/2004 | Nishiyama et al. |
| 2004/0181340 | A1 | 9/2004 | Smith |
| 2005/0039787 | A1 | 2/2005 | Bing |
| 2005/0086004 | A1 | 4/2005 | Smith |
| 2005/0154531 | A1 | 7/2005 | Kelly et al. |
| 2005/0197775 | A1 | 9/2005 | Smith |
| 2005/0240378 | A1 | 10/2005 | Smith et al. |
| 2006/0015254 | A1 | 1/2006 | Smith |
| 2006/0025106 | A1 | 2/2006 | Byers et al. |
| 2006/0265489 | A1 | 11/2006 | Moore |
| 2007/0008109 | A1 | 1/2007 | Wang |
| 2007/0047520 | A1 | 3/2007 | Byers et al. |
| 2007/0049260 | A1 | 3/2007 | Yuhara et al. |
| 2007/0073477 | A1 | 3/2007 | Krumm et al. |
| 2007/0100542 | A1 | 5/2007 | Courtney et al. |
| 2007/0150185 | A1 | 6/2007 | Nagase et al. |
| 2007/0159355 | A1 | 7/2007 | Kelly et al. |
| 2007/0252688 | A1 | 11/2007 | Eisold et al. |
| 2007/0275742 | A1 | 11/2007 | Zhang |
| 2007/0296575 | A1 | 12/2007 | Eisold et al. |
| 2008/0018453 | A1 | 1/2008 | Adler |
| 2008/0109317 | A1 | 5/2008 | Singh |
| 2008/0225848 | A1 | 9/2008 | Pilon et al. |
| 2009/0124232 | A1 | 5/2009 | D'Arcy et al. |
| 2009/0160873 | A1 | 6/2009 | Kew et al. |
| 2009/0273713 | A1 | 11/2009 | Goldman et al. |
| 2009/0309742 | A1 | 12/2009 | Alexander et al. |
| 2010/0082307 | A1 | 4/2010 | Dorum et al. |
| 2010/0145947 | A1 | 6/2010 | Kolman et al. |
| 2010/0162300 | A1 | 6/2010 | Velazquez et al. |
| 2010/0211971 | A1 | 8/2010 | Howater et al. |
| 2010/0211972 | A1 | 8/2010 | Howater et al. |
| 2010/0306154 | A1 | 12/2010 | Poray et al. |
| 2010/0321178 | A1 | 12/2010 | Deeds |
| 2011/0159837 | A1 | 6/2011 | Daly et al. |
| 2013/0338920 | A1 | 12/2013 | Pasken et al. |
| 2014/0087780 | A1 | 3/2014 | Abhyanker et al. |

OTHER PUBLICATIONS

Ansari, S., and S. Delgreco. "GIS Tools for Visualization and Analysis of NEXRAD Radar (WSR-88D) Archived Data at the National Climatic Data Center (NCDC)." AGU Fall Meeting Abstracts. 2004.*

Moosakhanian, FAA NextGen Weather Systems, Swim Success: Weather Access, Sep. 29, 2014.*

Microsoft, Bing Maps Tile System, accessed Jan. 18, 2017 at https://msdn.microsoft.com/en-us/library/bb2529689.aspx.*

Convert Quadtree to TMS or ZXY, Sep. 21, 2012, accessed Jan. 18, 2017 at http://www.simplehooman.co.uk/2012/09/convert-quadtree-to-tms-or-zxy.*

Pilots of America, How are TAFs made?, accessed Jan. 18, 2017 at https://www.pilotsofamerica.com/community/threads/howaretafsmade.46631/.*

IEM Provided NWS NEXRAD Imagery for GIS, Dec. 23, 2012, accessed Jan. 18, 2017 at http://web.archive.org/web/20121223040201/http://mesonet.agron.iastate.edu/GIS/ridge.phtml.*

OGC Web Services, Oct. 14, 2013, accessed Jan. 18, 2017 at http://web.archive.org/web/20131014210415/http://mesonet.agron.iastate.edu/ogc/.*

The Weather Company, Mosaic Catalog, accessed Jan. 18, 2017 at http://mosaicportal.weather.com/layers.html.*

MapData Services, The Tile API, Apr. 23, 2013, accesed Jan. 18, 2017 at http://web.archive.org/web/20130423071813/http://apps.nowwhere.com.au/MDSApiDocumentation/WebServices/Tile.*

Natural Resources Canada, Web Map Tile Service (WMTS), accessed Jan. 18, 2017 at http://www.nrcan.gc.ca/node/8940.*

* cited by examiner

FOUR DIMENSIONAL WEATHER DATA STORAGE AND ACCESS

PRIORITY CLAIM

This application claims priority to U.S. Provisional Patent Application No. 61/914,062 filed Dec. 10, 2013, which is hereby incorporated herein by reference in its entirety.

BACKGROUND

In today's computer industry, the term Big Data is often used to refer to large volumes of collected information from past events. Some use cases include user behavior data on web sites or medical patient information. These Big Data are then queried to look for statistical understanding from the data, for example, trends, means or norms. The results of the queries are often referred to as Big Data Analytics. To date, there has been no effective use of Big Data to efficiently update, process, and make use of weather data that is continuously being collected and that is disparate in time and space.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
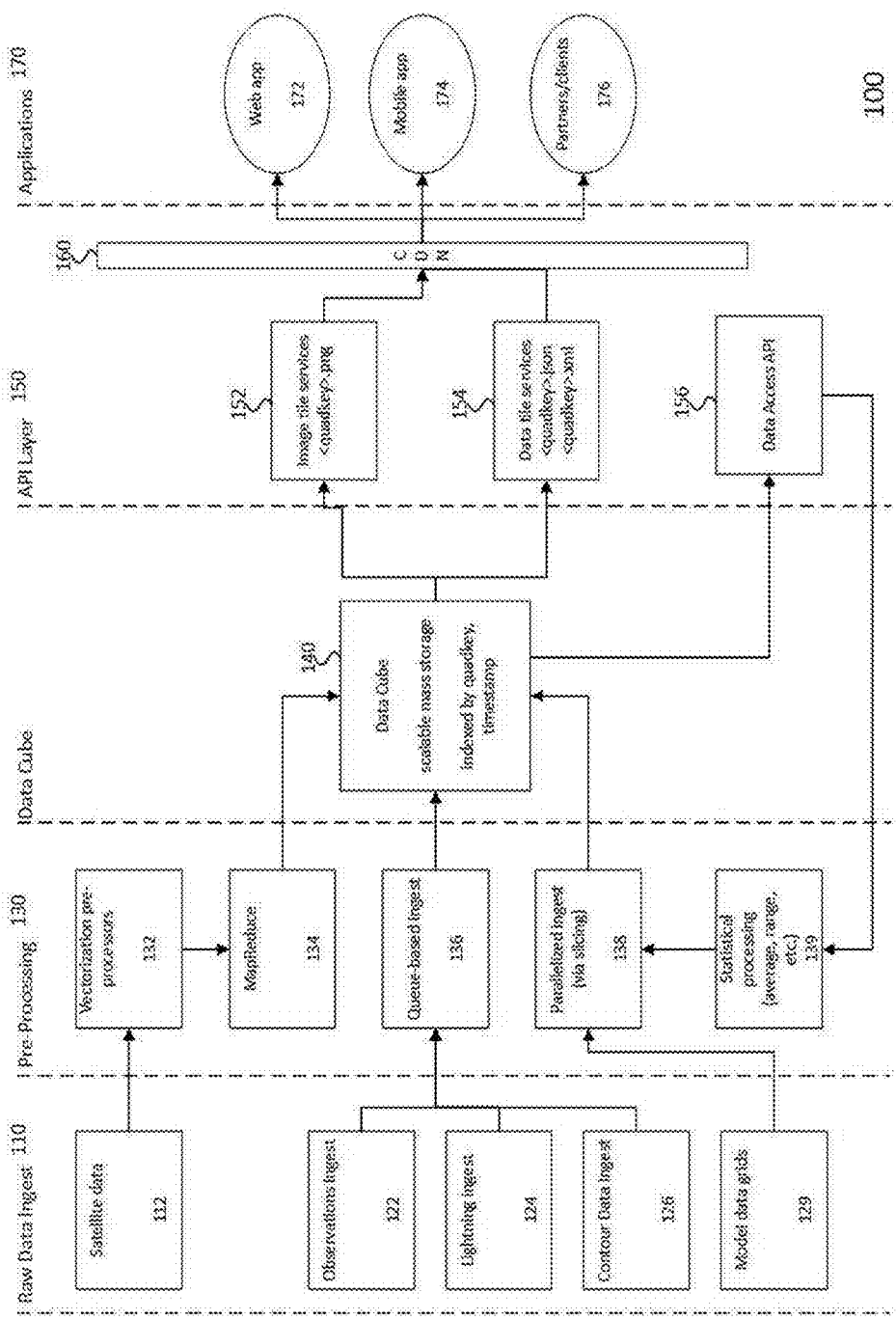
FIG. 1 is a diagram that illustrates data ingest, pre-processing, access and retrieval of time-indexed and geographic-indexed data stored in a mass storage data cube, in accordance with various representative embodiments.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Weather Data

The Big Data of interest are weather related or meteorological data that are continuously being collected, in some cases is very near real-time in nature, is volatile (new data replaces old data), and is disparate in time and space (location). In these ways, the vast amount of weather data that must be understood and used is quite different from usage of other Big Data, in which old data and trends must be analyzed and understood. The Big Data challenges of weather data scalability and the need to efficiently manage the storage and access to highly volatile, voluminous weather data with minimal processing latency is addressed herein.

In the field of meteorology, there are a larger number of different data types to help a human or computer application understand the atmospheric conditions in order to make an accurate forecast, to review observation data, to analyze past performance of computer application, to understand trends, to perform statistical analysis, etc. The data vary in Spatial type (point, contour, grid, image, etc.)

Timeframe of the data (valid at a specific time or over a range of time)

Spatial resolution of the data

Whether it is observation data/parameter or forecast data/parameter

Geographic projection

The terms data, weather data, atmospheric data and the like used herein, refer to forecast or observation data of weather or meteorological forecasts or conditions.

In order to be able to use this disparate data at the same time for a given scenario, be it a forecast, analysis, etc., the data must be in a common geographic framework and be time-matched. The framework for the data is referred to as the "Data Cube." The Data Cube stores data that is time- and geographic location-indexed, and accordingly uses a geographic tile-based or Quad key geographic framework. For a given geographical area on the earth, the area can be separated into four tiles (quad key) as the area becomes more specific or more "zoomed in" the area is sub-divided into four more tiles. This geographic framework is used by Google and Bing, for example, for their interactive mapping. The use of integer math in a quad key tile based location index allows for an efficient referencing method for quick access, grouping of data from one "zoom level" to another and is useful if trying to display the data in a map form.

The data also must be time-matched (time indexed) before it is stored in the Data Cube. Some data involved is observation data, valid at the time that the data was collected. Some data involved is forecast data, valid at some point in the future when the data are first created. Forecast data can take on many forms, but, for example, a numerical model is a computer program made up of equations of motion and numerical schemes to simulate atmospheric conditions.

Process of "Converting" to Tile Data

Surface observations consist of a number of variables at a given point. For example, at a location at an airport, the surface observation "station" will have a thermometer (to measure temperature), a hygrometer (to measure moisture content of the air), a rain gauge (to measure the amount of falling precipitation, an anemometer (to measure wind speed), etc. These observations are taken at this location at regular time intervals such as every 30 minutes. Across the United States (and the world) similar observation stations exist and report their data at similar time intervals.

The data are transmitted via local networks to a central distribution point. The data are then sent to users who are interested in the data. These data are ingested, decoded (if it is in a coded format) and then the latitude/longitude of the data associated with the nearest quad key in the tile system. The data is then stored in the Data Cube and accessed by the tile. The tile of data can be provided back to users in various formats (XML, JSON, etc.).

Some applications (mapping for example) need to have a visual representation of weather, more than just the numbers, such as temperature and wind speed. The data need to be shown as a colorized contoured field of data. To create this field of data the initial raw data have to be objectively analyzed. This objective analysis is fitting the data to a grid by performing interpolation between the raw data points. Once data is stored as a grid in the Data Cube in the quad keys that make up the organizational structure of the data in the Data Cube, the data can be easily retrieved. The new gridded form of the data can then be queried from the Data Cube and similar data returned from the raw form previously explained by valid at points "between" the initial raw observation locations.

To complete the visual representation of the observation data (think of a USA Today temperature map on the weather page), the gridded data then has to be contoured where each contour (say every 1-2 degrees F.) is drawn, then color shading is applied to the contours and the contours are then rendered as an image. The image is then broken into tiles (like a puzzle) so that the large image can be put back together by the requesting application.

Examples of Data to be Inserted Into the Data Cube

The numerical model is executed from an initial time, $T_0$, and is run for a predetermined amount of time with results produced at some convenient interval of time, such as thirty minutes or one hour. Variables that define the atmospheric conditions, such as temperature, humidity, pressure, wind speed, and wind direction are determine at various locations, typically on a grid of predefined locations in three dimensions and at each time interval of the forecast time, thus making the resulting numerical model data four dimensional (x, y, z, t). The numerical model data are then put into the Data Cube valid at times, $T_0$, $T_{30\ min}$, $T_{60\ min}$, $T_{90\ min}$, ... $T_{N\ min}$.

Weather satellite observation data can take a few forms. For example, weather satellites can have cameras attached to produce photographs of the earth taken from high above the earth. These photographs show where clouds are located, can indicate what types of clouds are part of the earth's weather system at a given time and when the photographs are shown in a series, speed and direction of movement can be determined. Weather satellites can also use infrared sensors to determine the temperature of the clouds that are observed at the top of the clouds. Using assumptions about the depth and temperature profile of the atmosphere, one can estimate the height of clouds using infrared satellite data. These various forms of weather satellite data may be compiled into imagery or pixel data valid at a given time. These data are then put into the Data Cube valid at the time of observation.

Radiosondes are instrumentation packages containing weather sensors, e.g., thermometer, barometer, hygrometer, along with a radio tracking device. These radiosondes are typically attached to a balloon and released into the atmosphere to take observations of the weather variables. The data are collected at a predefined interval during a balloons assent, e.g., every 10 seconds. These data are then put into the Data Cube valid at the time of the observation of the variables.

Examples Uses of the Data Cube

Meteorologists and other weather data users, often need to visualize and analyze weather data to help understand the weather situation for making a forecast, for doing analysis on past data to get a better understanding of how variables changed so as to help make a better forecast in the future or to understand statistically what the data can provide as information. With all the various data in the Data Cube, access to the necessary data can be simplified for the user to facilitate their data needs. The data may be accessed through an Application Programming Interface (API) that allows the user to specify what types of data are needed, for where the data are needed and for when the data are needed. Some examples that the Data Cube facilitates are:

Power utility companies during the summer months often have to make decisions about a particular day's power needs for their area of concern. They may have plenty of energy available to service the power needs, they may have to bring on additional resources to generate more energy to meet demand or they may have to purchase energy to meet demand. The decision process involves not only things like the day of the week and whether most businesses are open for business, but is greatly influenced by the weather and weather forecast, particularly the temperature, humidity and wind conditions. Based on the forecast of a very hot day, a power utility company may begin producing or buying more energy to meet the forecast demand due to the hot weather. Buying more energy from another power utility company can be a very expensive part of the utility company's business and thus optimizing the needs is necessary to keep costs down. With all the data in the Data Cube, a user can make requests for observation and forecast data for various times in the forecast period to best understand how the weather situation is expected to play out. Additionally, as time goes by in the forecast period additional data added to the Data Cube may reveal the need to buy less power or the need to buy more power due to changing weather information. A user may request information through the API from the Data Cube that reveals that the timing of a precipitation event is 1 hour before the last forecast indicated, thus meaning that temperatures will cool down earlier than was originally forecast and thus the power needs will be less than originally thought. The user can then make decisions based on this new information.

High voltage power lines are often run from tower to tower built in large open areas to move produced energy from the generation location to where the power needs are. In the western United States, these high voltage power lines can be roosting places for large wild birds. The birds will often leave bird excrement on the power lines. When high humidity and light wind conditions, like a dense fog situation occurs, the excrement can serve as a conductor and cause an arc to occur between power lines and this can result in an outage of the power lines cutting off the movement from the generation location to the location of need. Such an outage can be costly to the power utility company with lost revenue and fines. When moderate to heavy rain occurs, the excrement is washed off the power, thus eliminating the potential for an arcing and outage situation. If it has been a while since the excrement has been washed off the power lines, a power utility company may fly helicopters armed with power washers to wash off the excrement. With all the data in the Data Cube, a user can make a request to determine the length of time since the last moderate to heavy rain events to determine if the company needs to intercede and wash the lines themselves or if weather conditions will wash the lines for them.

Farmers depend on weather data to understand how their crops will mature, to determine what diseases the crops maybe be susceptible to and to predict when crops will be ready to harvest. Much of the weather information that is needed is crop dependent, thus requesting data from the Data Cube is not general but specific to a set of criteria for a given crop. Farmers us a calculation of Growing Degree Days (GDD) that is a measure of the average temperature above a base temperature. For example, if the base temperature for a particular crop is 65 degrees Fahrenheit and if the high temperature on a given day is 80 degrees and the low temperature is 60 degrees, the average temperature is 70 degrees and thus the GDD is 5 degrees (5 degrees above the base temperature). Each crop requires a certain number of GDDs to be ready to harvest.

Pilots need weather forecasts at a series of locations and altitudes for flight planning. The Data Cube stores weather forecasts from many different forecast models as well as human derived forecasts. Through an API request to the Data Cube, a user can request the "average" or "consensus" forecast at all points along a route or the request could be for the "most severe" or the "range" of forecasts.

FIG. 1 shows the flow of information into and out of the Data Cube for some example inputs and example outputs along with pre-processing processes necessary to organize data to be put into the Data Cube. The data are transmitted via local networks to a central distribution point. The data are then sent to users who are interested in the data. WDT ingests these data, decodes the data (it is in a coded format) and then associates the latitude/longitude with the nearest quad key in the tile system. The data is then stored in the Data Cube and accessed by the tile. The tile of data can be provided back to users in various formats (XML, JSON, etc.). This is reflected in the drawings in which Raw Data Ingest 110 occurs, followed by Pre-Processing 130 of the data, storage in the Data Cube 140, access to the stored and indexed data through API layer 150, and one or more Applications 170 that may wish to access the data indexed and stored in Data Cube 140.

Data may be received through satellite data ingest 112, observations ingest 122, lightning ingest 124, contour data ingest 126 and model data grids 128. The Data Cube storage has inputs of various weather data types and raw data examples on the left of the drawing can take on various forms (raster data, vector data, observations data, lightning data, model data). These data enter the Data Cube 140 through their respective processing methods 130 depending on the nature of the data, its spatial type, timeframe of the data, spatial resolution of the data, whether that data are observation or forecast in nature and the geographic projection of the data.

As shown in the figure, for example, some data types are raster in form, such as satellite data 112. To be stored as data tiles they are converted to vector data through vectorization pre-processors 132 and then further organized (filtered and sorted) by a process commonly referred to as MapReduce 134.

Surface observations, are data such as temperature, humidity, winds (wind speed and wind direction), etc. observed by a number of meteorological sensors that are co-located at a given site (point data) and, together with Lightning data and Contour data, for example, are ingest as Point data Ingest 120. These point data often arrive asynchronously as Observations Ingest 122 and are put on a "queue" to be moved into the Data Cube, as shown by Queue-based ingest 136. Lightning data are point data, are data valid at a given location, the location of a lightning strike as estimated by a network of sensors and are ingest by Lightning Ingest 124. Lightning, like surface observations, are processed by Queue-based ingest 136.

Some applications (mapping, for example) need to have a visual representation of weather, more than just the numbers, such as temperature and wind speed. The data need to be shown as a colorized contoured field of data. To create this field of data the initial raw data, collected by Contour Data Ingest 126, have to be objectively analyzed. This objective analysis is fitting the data to a grid by performing interpolation between the raw data points. Once stored as grid data in the Data Cube, the grid data is comprised of the quad keys that make up the organizational structure of the data in the Data Cube. As previously mentioned, the new grid form of the data can then be queried from the Data Cube and get back similar data as was returned from the raw form previously explained by valid at points "between" the initial raw observation locations.

Model data grids 128, or numerical model data, are the raw output data from numerical models. The numerical models are computer programs that use assumptions about the state of the atmosphere and solve equations of motion of the atmosphere. The grids are four dimensional grids (x, y, z, t) of each variable (e.g., temperature, humidity, winds speed, wind direction). These model data grids tend to be very large datasets (many gigabytes of data) and thus have to be broken into smaller parts (slices) through a parallelized ingest process 138. The smaller parts of data allow the data to be then stored in the Data Cube more efficiently. Since model data tends to be very large and there are numerous different models that can vary significantly from each other, storing the statistical variations of the model solutions is valuable as well. Thus, specific data (slices) or all the model data can be pulled from the Data Cube, processed through statistical techniques and the results also stored in the Data Cube The Data Cube uses a quad key organizational structure so that the data can be queried out of storage relatively fast. For example, an image tile request system, shown as Image tile services 152, pulls data from the Data Cube for a given location (point or area) and data are then rendered into a series of tiled images that can then be pieced together by a downstream application 172, 174, 176, such as a mapping application that places the tiled images on the map (a web app 172 or mobile app 174). Similarly, some applications may want actual data rather than imagery and thus the tiles are returned to a requesting Data tile services 154 as a "data tile" where the data is valid at the tile location.

Once stored in the Data Cube, various systems and users will want access to the data, through an API, such as Data Access API 156. The API allows users to specify the type of data they are requesting, the location (e.g., region, point, entire world), the valid date/time of the data, the source of the data, and any input that may be needed for a calculation. Two examples are shown where an Image tile request system (shown as Image tile services 152) is making requests for data from the Data Cube 140 to generate quad key (tiles) forms of imagery, such as <quad key>.png and Data tile services 154 is making requests data valid at a particular quad key location for JSON or XML format. The data in this case are accessed by end users or end user applications through a CDN (Content Delivery Network 160) which serves as a caching mechanism so that identical results are not recreated over and over for each individual user.

Often times, the amount of data being requested for simultaneous users from the Data Cube is very large and many of the requests are the same. So, a Content Delivery Network (CDN) 160 is used to cache the query results for more rapid access to the results. Once requests for the cached data are no longer occurring, after some amount of time has passed (such as 24 hours), the data are dropped from the cache.

Other applications from clients and partners can also make requests to the API for data or image tiles. Data pulled from the Data Cube can also be processed by various statistical techniques at Statistical processing block 139. As indicated in the drawing, statistical processing can be model averaging, processing of ranges, etc.

Figure 2:
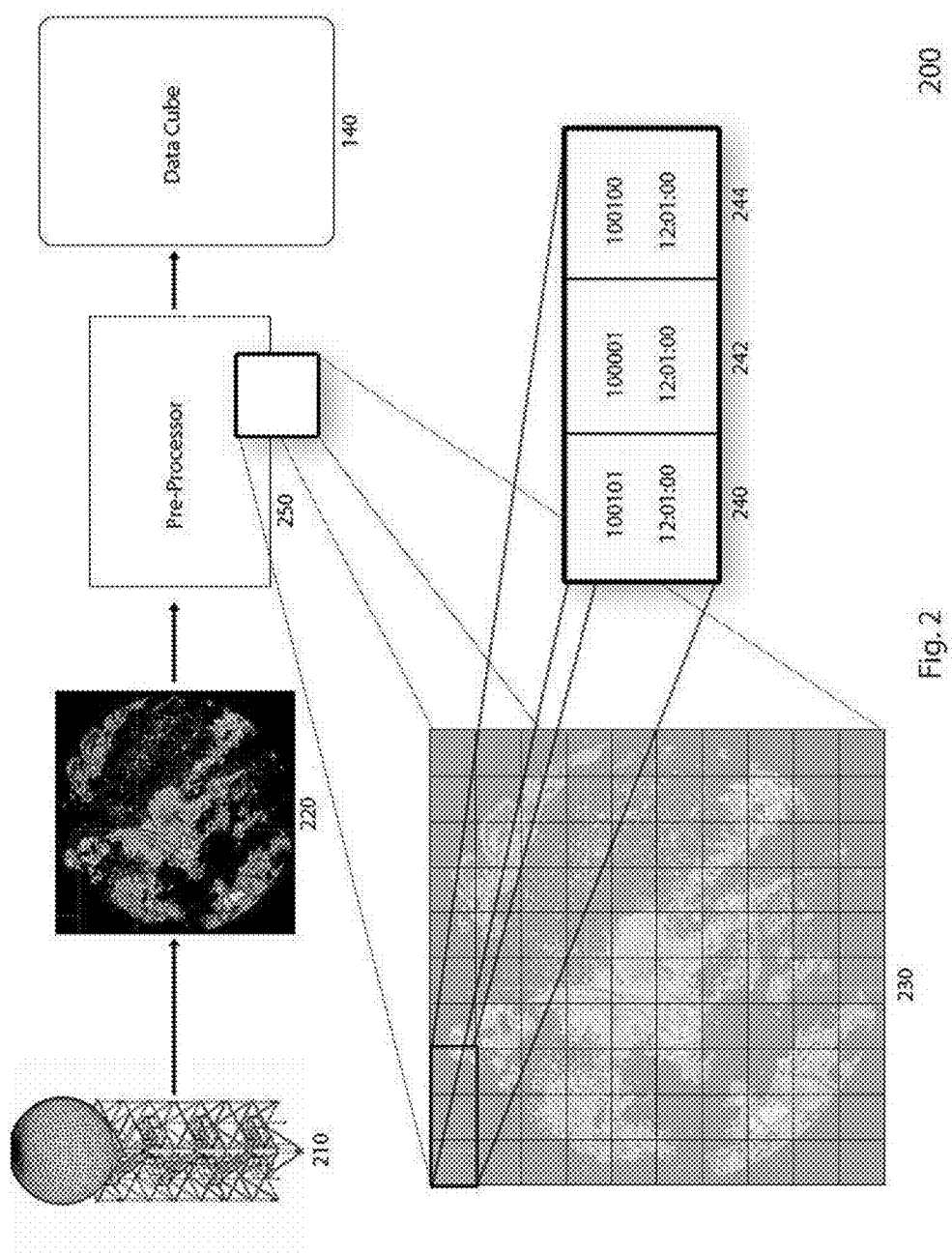
FIG. 2 illustrates an example of processing data before storage in a mass storage data cube, in accordance with various representative embodiments.

Referring now to FIG. 2, an example 200 of pre-processing data for the Data Cube 140 is shown. In this particular example, a weather radar 210 collects data on the intensity of the "returned" power (or reflectivity). The intensity is traditionally shown as a radar image 220 for a user to understand where weather events are taking place within the coverage area of the radar. To store these data in the Data Cube 140, the data are sent to a pre-processor 250 that converts the data to a series of tiles (quad key and time indexed) 240, 242, 244 for ease of storage and access. Each tile 240, 242, 244 in the Data Cube represents a small area of the radar coverage 230 and is valid at a specific time. For example, it can be seen that tiles 240, 242, 244 are each valid at time 12:01:00.

Figure 3:
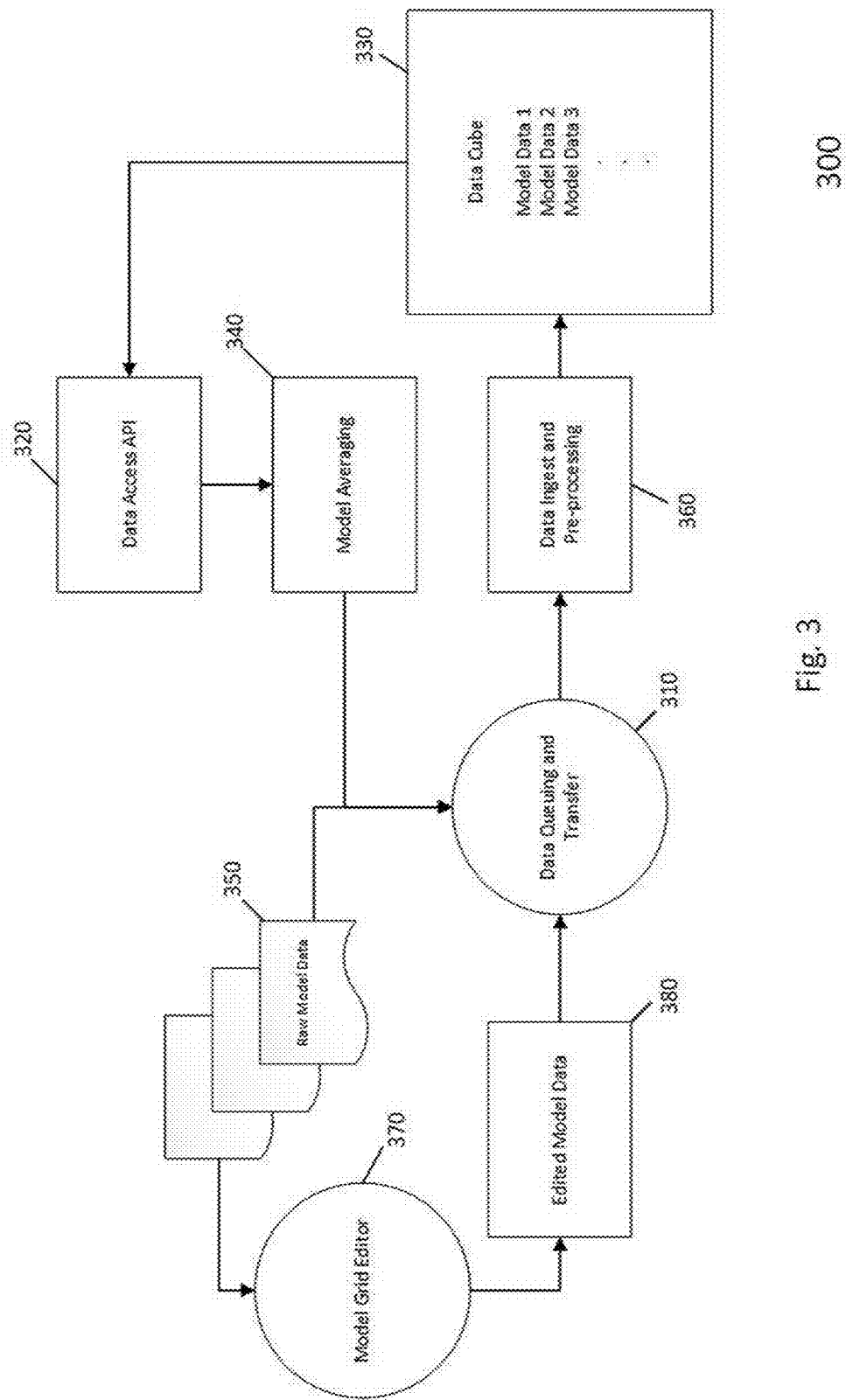
FIG. 3 illustrates upstream processing to store data in a mass storage data cube, in accordance with various representative embodiments.

FIG. 3 illustrates an implementation of the upstream processing to store data in the Data Cube. To move data from one process to another or to notify a process that data is available for use, a data queuing and transfer mechanism 310 exists between many of the steps in the process. The data queuing and transfer block 310 can be a client server application that servers as a client notification system, for example.

The Data Access API 320 serves as the interface for external applications to pull data from the Data Cube 330 and in some cases, as shown here, the data from the Data Cube are pulled into a model averaging process 340. A model, in this case, is a numerical weather prediction model. Each model (Raw Model Data 350) is moved via the data queuing and transfer mechanism 310 to the Data Ingest and Pre-processing module 360 and then stored in the Data Cube 330. Each individual model represents a different solution (prediction) of the atmospheric conditions. A statistical averaged solution is then also stored in the Data Cube for external distribution. The Data Ingest module 360 preprocesses the data (turning it into tiled data that is time indexed) to allow the data to be stored in the Data Cube.

Oftentimes, model data are used by forecasters as a first guess for their "final" or "official" forecast. Forecasters can edit the raw model data grids using a model grid editor 370 and the resulting edited model data 380 can also serve as an input into the Data Cube 350.

Figure 4:
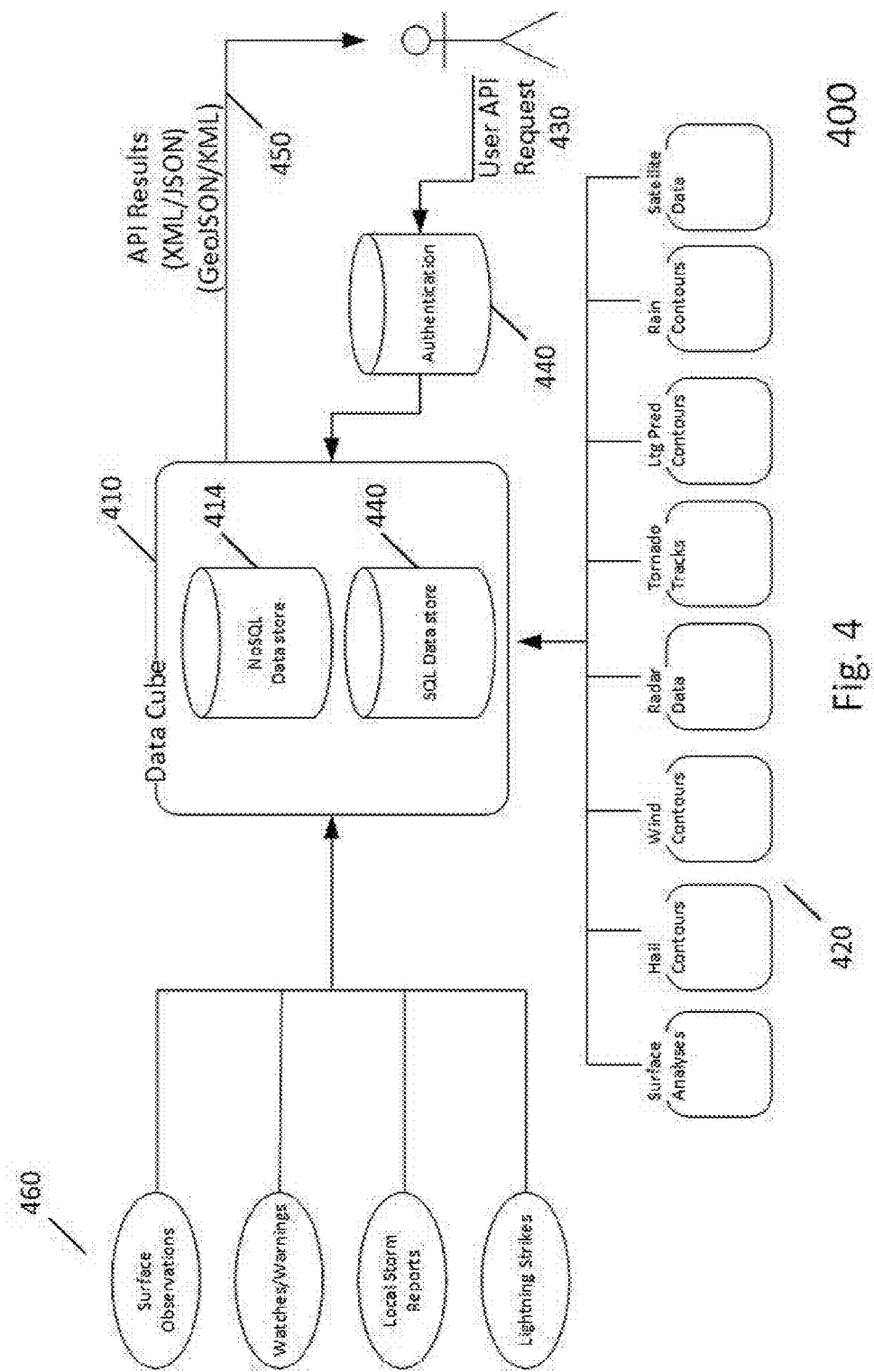
FIG. 4 illustrates retrieving stored forensics data through an application programming interface to one or more users, in accordance with various representative embodiments.

Referring now to FIG. 4, an example implementation 400 in which a Data Cube provides Forensics (past) data through an API to users is shown. The Data Cube implementation contains both data in a NoSQL form (for unstructured data) in NoSQL Data store 412 as well as in a relational (SQL) database form (for structured data) in SQL Data store 414. Various derived data types 420 (surface data analysis, hail contours, tornado tracks, etc.) as well as raw real-time data 460 (surface observations, Watches/Warnings, etc.) are stored in the Data Cube 410. Users can make an API request 430 for archived or past data from the Data Cube. If the request is authenticated as allowed by the Authentication system 440, the results 450 of the request are then returned to the user in various data formats such as XML, JSON, GeoJSON, and KML.

Figure 5:
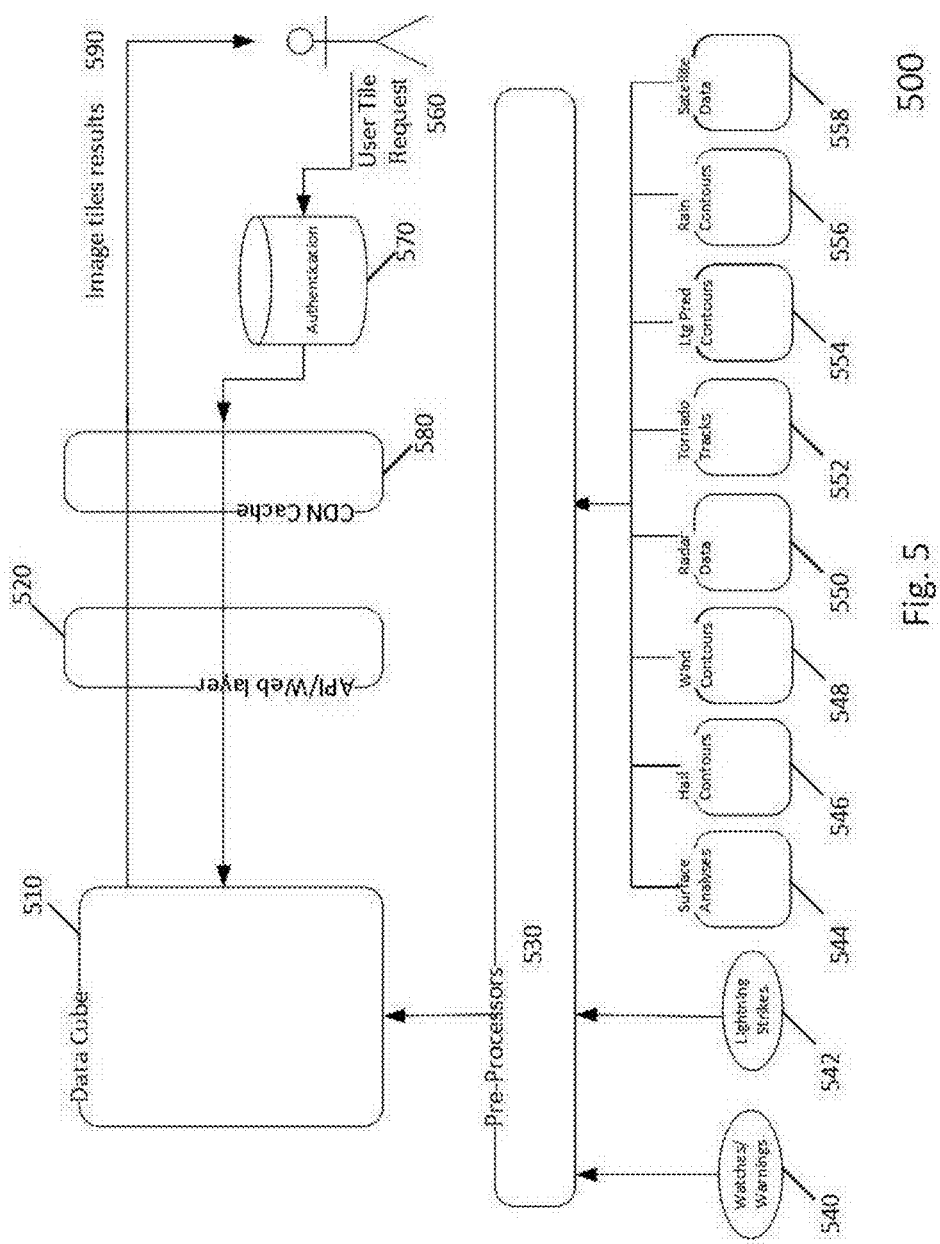
FIG. 5 illustrates data processing, image tile generating and store in a mass storage data cube for access via an API layer, in accordance with various representative embodiments.

FIG. 5 provides a detailed example implementation of data processing, image tile generation and storage in the Data Cube 510 for access via an API layer 520. Pre-processors 530 ingest various weather data types 540-558 (Watches/Warnings 540, Lightning Strikes 542, Surface Analysis 544, Hail contour data 546, etc.), decode and organize the data to be stored in the Data Cube 510 in its quad key indexed and time indexed structure. Through an Application Programmer Interface (API) a user can make a tile request 560 for a single tile or an area of tiles, for a single time or series of times. The request may require that the user is authenticated at Authentication block 570. Once authenticated, the request is routed to a Content Delivery Network (CDN) cache 580 to see if the same request has already been made and results stored previously. If so, the results are simply returned from the cache and no additional computing or data transfer takes place. If the request is new or unique, the request is then passed on to the API/Web layer 520 where the query is sent to the Data Cube 510 and the results are calculated and returned as tiled images 590 to the user.

Figure 6:
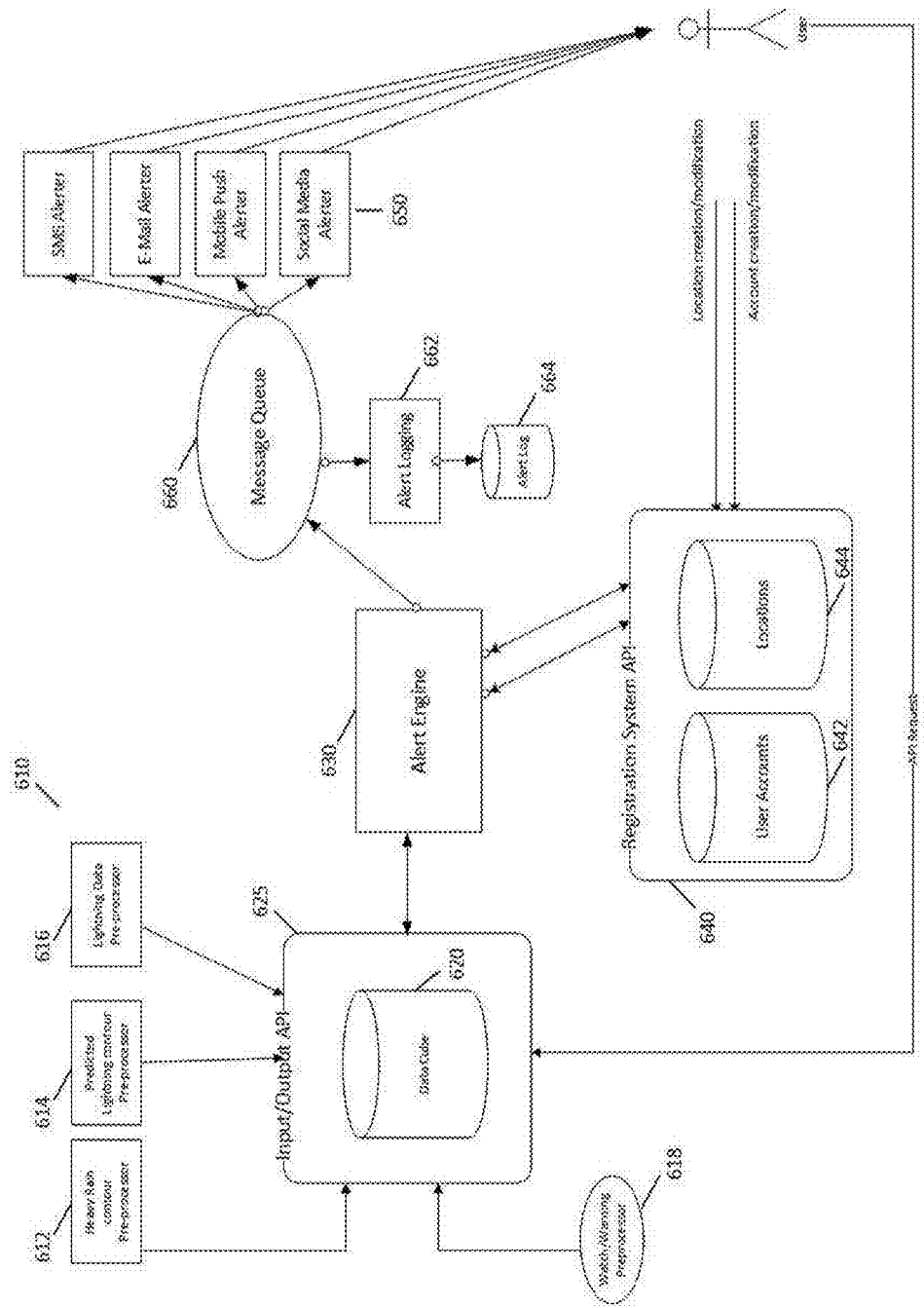
FIG. 6 illustrates the use of a mass storage data cube for weather alerting, in accordance with various representative embodiments.

FIG. 6 illustrates the use of the Data Cube for weather alerting processes.

Various weather data types (Heavy Rain data, Lightning Prediction data, lightning data, watch/warning data, etc.) are ingest into the Data Cube 620 through pre-processors 610 (Heavy Rain contour Pre-processor 612, Predicted Lightning contour Pre-processor 614, Lightning Data Pre-processor 616, Watch/Warning Pre-processor 618) that decode and organize the data to store it in the Data Cube 620. As a means of putting data in or pulling data out of the Data Cube, an Application Programming Interface (API) 625 sits between the external processes 610 and the Data Cube 620.

The Alerting Engine 630 performs checks with the Registration System API 640 to see if a given location (such as the user location stored in the Locations database 644 and reflected in the user's account stored in the User Accounts database 642, for example) is in an alert condition and a message (alert) needs to be sent to a user through a number of various alerting mechanisms 650 (SMS Alerter, E-mail Alerter, Mobile Push Alerter, Social Media Alerter, etc.). Once an alert condition is detected, the Alert Engine 630 generates the message and sends the message to the Message Queue 660 along with the necessary user information (such as alerting mechanism). The Message Queue then routes the alert to the proper alerting mechanism to send the alert to the user as shown.

Upon receiving an alert, a user may then select to make a request for data from the Data Cube through the API, the API Request 670, to get more information about the data that generated the alert condition.

For retrospective investigation and analysis, alerts that are generated are logged via an Alert Logging process 662 and stored in an Alert Log database 664.

It will be appreciated that embodiments of the invention described herein may be comprised of one or more conventional processors and unique stored program instructions that control the one or more processors to implement, in conjunction with certain non-processor circuits, some, most, or all of the functions described herein. The non-processor circuits may include, but are not limited to, a receiver, a transmitter, a radio, signal drivers, clock circuits, power source circuits, and user input devices. As such, these functions may be interpreted as a method to perform functions in accordance with certain embodiments consistent with the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that a program flow and associated data used to implement the embodiments described above can be implemented using various forms of storage such as Read Only Memory (ROM), Random Access Memory (RAM), Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present invention. Such alternative storage devices should be considered equivalents.

Various embodiments described herein are implemented using programmed processors executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method of processing mass stored weather data, comprising:

accessing from a mass storage data cube one or more tiles of requested weather data identified by the one or more time indices and the one or more geographic location indices;

providing the one or more accessed tiles to a modeling processor; and the modeling processor processing data of the one or more accessed tiles to generate new data of a new prediction model.

2. The method of claim 1, further comprising performing accessing one or more tiles of the requested weather data identified by the one or more time indices and the one or more geographic location indices responsive to a request at an application programming interface (API) that specifies the one or more time indices and the one or more geographic location indices of requested weather data.

3. The method of claim 1, further comprising:
processing the new data of the new prediction model to index the new data with respect to location and time to generate one or more new tiles each characterized by a geographic location index and a time index; and
storing the one or more new tiles in the mass storage data cube in accordance with the geographic location index and the time index of each new tile.

4. A method of processing weather data stored in four dimensions, comprising:
accessing from a mass storage data cube one or more tiles of requested weather data identified by one or more time indices and one or more geographic location indices;
providing the one or more accessed tiles to a processor;
processing, by the processor, data of the one or more accessed tiles to perform one or more of analyzing weather data retrieved from the mass storage data cube, performing a calculation using weather data retrieved from the mass storage data cube, and generating a new prediction model.

5. The method of claim 4, further comprising:
ingesting weather data to be stored;
processing the ingested weather data to index the weather data with respect to location and time to generate the one or more tiles each characterized by a geographic location index and a time index; and
storing the one or more tiles in the mass storage data cube in accordance with the geographic location index and the time index of each tile, wherein stored weather data in the mass storage data cube has a common geographic location index format and stored weather data can be accessed by the tiles stored in the mass storage data cube.

6. The method of claim 5, wherein processing the ingested weather data further comprises decoding the ingested weather data.

7. The method of claim 4, wherein each tile is characterized by a geographic location index of the processed weather data is a quad key tile based location index and processing the ingested weather data comprises associating the latitude and longitude of the ingested weather data with a nearest quad key in a quad key tile based system.

8. The method of claim 4, wherein the weather data is observation data valid at the time of observation of the data.

9. The method of claim 8, wherein the weather data is one or more of weather satellite observation data, radar data and lightning data.

10. The method of claim 9, wherein the weather data is collected by radiosondes and valid at the times of collection during predefined intervals during an assent of the radiosondes.

11. The method of claim 4, wherein the weather data is forecast data valid at a future time when the data is created.

12. The method of claim 11, wherein the forecast data is a numerical model that simulates one or more atmospheric weather conditions from an initial time at an initial geographic location to one or more time intervals at corresponding geographic locations.

13. The method of claim 4, further comprising:
responsive to a request at an application programming interface (API) that specifies the one or more time indices and the one or more geographic location indices of requested weather data, accessing one or more tiles of the requested weather data identified by the one or more time indices and the one or more geographic location indices and providing the one or more accessed tiles to one or more of an image tile service and a data tile service; and
one or more of the image tile service and the data tile service making available the requested weather data to a requester of the requested weather data.

14. The method of claim 13, further comprising accessing one or more tiles from the mass storage data cube in accordance with the one or more time indices and the one or more geographic location indices specified in the request, the one or more accessed tiles containing the requested weather data;
providing the one or more accessed tiles to one or more of the image tile service and the data tile service;
one or more of the image tile service and the data tile service caching the one or more accessed tiles in a cache of a content delivery network (CDN); and
the requester of the requested weather data accessing the one or more cached tiles containing the requested weather data from the content delivery network.

15. The method of claim 14, further comprising:
responsive to a subsequent request for the requested weather data, determining whether one or more tiles containing the subsequently requested weather data are stored in the cache of the CDN;
accessing the one or more tiles containing the subsequently requested weather data from the cache of the CDN if the one or more tiles containing the subsequently requested weather data is determined to be stored in the cache of the CDN; and
otherwise, accessing one or more tiles containing the subsequently requested weather data from the mass storage data cube in accordance with the one or more time indices and the one or more geographic location indices specified in the subsequent request.

16. The method of claim 15, further comprising one or more of the image tile service and the data tile service caching the one or more tiles containing the subsequently requested weather data in the cache of a content delivery network (CDN).

17. The method of claim 13, further comprising:
determining whether the requested weather data is stored in a cache of a content delivery network (CDN) coupled to the mass storage data cube;
accessing one or more tiles containing the requested weather data from the cache of the CDN in accordance with the one or more time indices and the one or more geographic location indices specified in the request if it is determined that the requested weather data is stored in the cache of the CDN;
otherwise, accessing one or more tiles containing the requested weather data from the mass storage data cube in accordance with the one or more time indices and the one or more geographic location indices specified in the request; and providing the accessed one or more tiles containing the requested weather data to one or more of the image tile service and the data tile service.

18. The method of claim 17, further comprising:
authenticating the request made at the application programming interface (API);
routing the authenticated request to the CDN and determining whether the requested weather data is stored in the cache of a content delivery network (CDN);
if the requested weather data is stored in the cache of the CDN, accessing one or more tiles containing the requested weather data from the cache of the CDN in accordance with the one or more time indices and the one or more geographic location indices specified in the request and the CDN providing the one or more CDN accessed tiles to the requester; and
if the requested weather data is not stored in the cache of the CDN, routing the authenticated request to the mass storage data cube via an API/Web layer, accessing one or more tiles of the mass storage data cube in accordance with the one or more time indices and the one or more geographic location indices specified in the request, and providing the one or more mass storage data cube accessed tiles to the requester.

19. The method of claim 13, further comprising:
authenticating the request at the application programming interface (API) prior to one or more of the image tile service and the data tile service making available the requested weather data to the requester of the requested weather data.

20. The method of claim 13, wherein the requester of the requested weather data is one or more of a Web app, a mobile app, a client app.

21. The method of claim 4, further comprising:
determining whether a location of a user is within a weather alert condition;
responsive to determining that the location of the user is within the weather alert condition, communicating to the user via a generated alert message that the location of the user is within the weather alert condition; and
responsive to a request from the user for information about the weather alert condition, the request from the user specifying one or more time indices and one or more geographic location indices of requested weather data, accessing one or more tiles of the requested weather data identified by the one or more time indices and the one or more geographic location indices and providing the one or more accessed tiles to the user.

22. The method of claim 21, further comprising:
an alerting engine coupled to an application programming interface (API) at which the user made the request for information about the weather alert condition determining whether the location of the user is within the weather alert condition by checking the location of the user through a registration system application programming interface (API); and
responsive to the alerting engine verifying the location of the user is within the weather alert condition, the alerting engine generating the generated alert message and transmitting the generated alert message to a message queue that routes the generated alert message to the user.

23. The method of claim 4, where analyzing weather data retrieved from the mass storage data cube comprises reviewing weather forecast data previously stored in the mass storage data cube, the weather forecast data including one or more of temperature, humidity and wind conditions.

24. The method of claim 4, where analyzing weather data retrieved from the mass storage data cube comprises determining a length of time since an event occurrence to determine whether an action is needed in view of the determined length of time since the event occurrence.

25. The method of claim 4, where analyzing weather data retrieved from the mass storage data cube comprises performing statistical analysis of a plurality of forecast weather data previously stored in the mass storage data cube to determine an average forecast along a route, to determine a most severe forecast along the route, or to determine a range of previously stored forecasts along the route.

26. The method of claim 4, where analyzing weather data retrieved from the mass storage data cube comprising analyzing past performance of a weather application.

27. The method of claim 26, where analyzing weather data retrieved from the mass storage data cube further comprises determining from the retrieved weather data when an alert condition exists.

28. The method of claim 27, further comprising transmitting an alert message about the alert condition to a user.

29. The method of claim 28, further comprising responsive to receiving the alert message about the alert condition the user requesting to receive the analyzed weather data.

30. The method of claim 4, where making a calculation based upon weather data retrieved from the mass storage data cube comprises performing a calculation using historical data retrieved from the mass storage data cube.

31. The method of claim 30, further comprising calculating a growing degree days (GDD) from temperature weather data retrieved from the mass storage data cube.

\* \* \* \* \*